Patented Oct. 14, 1952

2,614,120

UNITED STATES PATENT OFFICE 2,614,120

β-HYDROXYALKYL DIESTERS OF DICARBOXYDIPHENYL SULFONES AND METHOD OF PREPARING SAME

John R. Caldwell, Kingsport, Tenn., assignor to Eastman Kodak Company, Rochester, N. Y., a corporation of New Jersey No Drawing. Application February 10, 1950, Serial No. 143,594

10 Claims. (Cl. 260—470)

This invention relates to the preparation of meta- and para-dicarboxydiphenyl sulfones, β-hydroxyalkyl diesters thereof and their preparation, and linear polyesters thereof and their preparation.

Bis(p-carboxyphenyl) sulfone is a known compound, cf. Meyer, Annalen der Chemie 433, 336 (1923), and melts at 370° C. The methyl and ethyl diesters of this dibasic organic acid are also known and have melting points of 194° and 158° C., respectively.

I have discovered an improved process for the preparation of bis(p-carboxyphenyl) sulfone and other related meta- and para-dicarboxydiphenyl sulfones which comprises oxidizing a meta- or para-dimethyldiphenyl sulfone in the presence of a cobalt or manganese catalyst in a solvent which is substantially inert to oxidation and which contains a lower aliphatic aldehyde as an oxidation promoter, at a temperature of from 70°–120° C. The procedural steps of this process are set forth to a considerable extent in U. S. Patent No. 2,245,528 issued June 10, 1941 which discusses a process involving somewhat similar steps but which is applied to the oxidation of entirely different alkyl-substituted aromatic compounds. Hereinafter when dicarboxydiphenyl sulfones are referred to, the following compounds are signified: bis(p-carboxyphenyl) sulfone, bis(m-carboxyphenyl) sulfone, and 4,3'-dicarboxydiphenyl sulfone. The following compounds can also be encompassed within the scope of this term: bis(p-carboxy-m-methylphenyl) sulfone, bis(m-carboxy-p-methylphenyl) sulfone, and 4,3'-dicarboxy-3,4'-dimethyldiphenyl sulfone.

Bis(p-carboxyphenyl) sulfone and its related compounds are very difficult to esterify by the usual methods because of their high melting points and extremely low solubilities. Thus, the lower alkyl esters can be prepared by refluxing a meta- or para-dicarboxydiphenyl sulfone with a large excess of a lower alkyl alcohol for a long period of time. Likewise, in order to prepare the β-hydroxyethyl ester of bis(p-carboxyphenyl) sulfone it is necessary to reflux the sulfone with a large excess of glycol at 190°–200° C. for from 30–40 hours. This high temperature and long period promote decomposition. Furthermore, a complex mixture is obtained that is very difficult to purify. It is therefore, quite surprising that I have found that these dicarboxydiphenyl sulfones can be esterified quite readily with ethylene oxide or other related epoxy compounds. Thus, I have found that these dicarboxydiphenyl sulfones react with an epoxy compound containing a

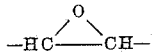

group (an alkylene oxide), in the presence of a tertiary amine as a catalyst to form the corresponding β-hydroxyalkyl diesters of these dicarboxydiphenyl sulfones. These β-hydroxyalkyl diesters are especially valuable inasmuch as I have discovered that they can be readily converted into new and useful linear polyesters by heating in the presence of the simple glycols (straight chain alkane-diols with the hydroxy radicals positioned at each end of the alkylene chain) and, in some instances, in the presence of some diethylene glycol. Furthermore, the β-hydroxyethyl diesters can be converted directly into linear polyesters by heat alone although some modifying agent is usually added to obtain the best products. In a broader sense, I have found that linear polyesters can be prepared by reacting the lower molecular weight alkyl diesters or β-hydroxyalkyl diesters of the meta- and para-dicarboxydiphenyl sulfones with the above-defined glycols or with lower fatty acid esters of such glycols in the presence of an alkali metal or alkaline earth metal or a hydroxide or alkoxide thereof. The free dicarboxydiphenyl sulfone can also be employed in this reaction but with considerable difficulty since these free acids are quite insoluble and long periods of time are required to prepare relatively small yields. Thus, it is considerably more advantageous to employ a diester of the dicarboxydiphenyl sulfone in conducting the polyesterfication reaction. Most advantageously, the β-hydroxyalkyl diesters are employed.

It is an object of my invention to provide novel linear polyesters prepared from meta- and para-dicarboxydiphenyl sulfones and a process for their preparation. It is also an object to provide β-hydroxyalkyl diesters of these dicarboxydiphenyl sulfones and a process for their preparation. A further object is to provide an improved process for the preparation of the meta- and para-dicarboxydiphenyl sulfones. Other objects will appear hereinafter.

The dicarboxydiphenyl sulfones employed in accordance with my invention can be represented by the following formula:

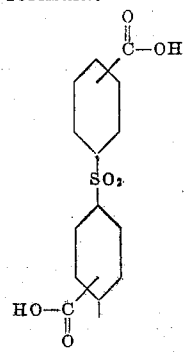

where the carboxyl groups are attached to the phenyl radicals in positions either meta or para to the sulfone group. These compounds are, generally speaking, known, cf. Annalen der Chemie 433, 336 (1923). In accordance with one phase of my invention, I have discovered an improved method for the preparation of these dicarboxydiphenyl sulfones which comprises oxidizing a compound of the formula:

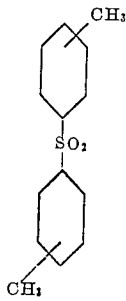

with oxygen (or a gas containing oxygen such as air) in the presence of a catalyst such as an acetate of either cobalt or manganese in a solvent which is substantially inert to oxidation (e. g., dioxane, acetic acid, propionic acid, butyric acid, etc.) containing a aliphatic aldehyde as a promoter (e. g., acetaldehyde, propionaldehyde, isobutyraldehyde, n-butyraldehyde, etc.), at a temperature of from 70°–120° C. (preferably 80°–110° C.).

The reaction is advantageously conducted in accordance with the following procedure. The catalyst is suspended in the solvent and the mixture is heated to about 90° to 95° C. or any other suitable temperature in the range of 70° to 120° C. A mixture of oxygen and aldehyde vapors is passed into the mixture with good agitation. When employing a cobalt catalyst the color of the solution changes from pink to dark green showing that the catalyst has been activated. A solution of the dimethyldiphenyl sulfone is then slowly added while the introduction of aldehyde and oxygen is continued. The aldehyde is oxidized to the acid and keeps the catalyst in an active state. At the same time, the methyl groups of the sulfone are oxidized to carboxyl groups. The dicarboxydiphenyl sulfone separates from the reaction mixture as fine crystals. This product can be further purified by dissolving in alkali, filtering and precipitating with dilute HCl.

In order to further illustrate this phase of my invention, reference is made to the following working example:

*Example 1.—Preparation of bis(p-carboxyphenyl) sulfone*

One hundred (100) cc. of acetic acid and 7 g. of cobalt acetate were mixed and heated to 90°–95° C. Oxygen was bubbled into the solution through a dispersion plate and 25 g. of acetaldehyde were pumped in during a period of one hour. The color of the solution changed from pink to dark green showing that the catalyst (cobalt acetate) had been activated. A solution of 30 g. of bis(p-methylphenyl)sulfone in acetic acid was then added dropwise over a period of 12–14 hours. During this time, oxygen was continuously bubbled into the solution and a total of 70–80 g. of acetaldehyde was added. The aldehyde feed was then stopped and the reaction mixture was filtered. A cake of bis(p-carboxyphenyl)sulfone was obtained. It was washed with water followed by dilute HCl and then more water. The yield was 36 g. of bis(p-carboxyphenyl) sulfone which is a 96% yield. It titrated to give an equivalent weight of 154; the calculated weight was 153. The product can be further purified by dissolving it in aqueous alkali and precipitating with dilute HCl or $H_2SO_4$.

Similar results can be obtained employing acetaldehyde as the promoter, and manganese acetate as the catalyst to oxidize bis(m-methylphenyl) sulfone to form bis(m-carboxyphenyl) sulfone. Similarly, other dicarboxydiphenyl sulfones can be prepared such as 4,3' dicarboxydiphenyl sulfone.

These dicarboxydiphenyl sulfones can be employed as such in the preparation of linear polyesters; however, due to their high degree of insolubility and slow rate of reaction, it is advantageous to convert these free acids into their diesters prior to the preparation of linear polyesters therefrom. The alkyl diesters can be prepared by refluxing the free acid with a large excess of an alkyl alcohol. Standard esterification catalysts and procedures can be employed, however these simple alkyl diesters are not, as I have discovered, as advantageously employed in the preparation of linear polyesters as are the β-hydroxyalkyl diesters of the dicarboxydiphenyl sulfones. Examples of the alkyl diesters are the methyl, ethyl, propyl and butyl diesters of the meta- and para-dicarboxydiphenyl sulfones.

In order to prepare the β-hydroxyalkyl diesters I have found that if a glycol is employed, it is necessary to employ a large excess of it at relatively high temperatures for extended periods of time in order to obtain the diester in appreciable quantity. Thus, bis(p-carboxyphenyl)-sulfone and ethylene glycol (in large excess) require heating over a period of from 30 to 40 hours at around 190°–200° C. to obtain a reasonable yield. These high temperatures and extended period of reaction time result in some decomposition and the desired diester is difficult to separate from the complex reaction mixture produced.

The β-hydroxyalkyl diesters can, however, be very readily produced in good yields in accordance with one phase of my invention wherein, a meta- or para-dicarboxydiphenyl sulfone is reacted with an epoxy compound containing from 2 to 4 carbon atoms and having the formula:

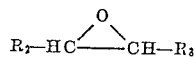

wherein $R_2$ and $R_3$ each represents a hydrogen atom, a methyl radical or an ethyl radical, in the presence of a tertiary amine as a catalyst, at a temperature of from about 80° to about 150° C., and in accordance with the following chemical equation:

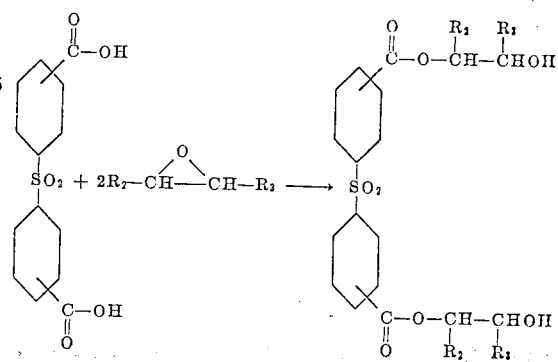

wherein $R_2$ and $R_3$ are defined and limited as above. Thus, the epoxy compound is selected from among ethylene oxide, 1,2-propylene oxide, 2,3-butylene oxide and 1,2-butylene oxide. Higher alkylene oxides can also be employed but with less practicability. The ethylene oxide product is the most advantageous for the preparation of linear polyesters.

Tertiary amine catalysts that can be employed include the trialkylamines containing from 3 to 12 carbon atoms, such as trimethylamine, triethylamine, tripropylamine, tributylamine, etc., the monoaromatic dialkyamines such as dimethylaniline, diethylaniline, etc., and the heterocyclic, —N= atom-containing tertiary amines such as quinoline, pyridine, etc. Advantageously, from 0.5 to 3.0 per cent of the tertiary amine is employed, based on the weight of the dicarboxydiphenyl sulfone being reacted; however, larger or smaller proportions can also be utilized. Advantageously the tertiary amine is selected from among trimethylamine, triethylamine, dimethylaniline, pyridine and quinoline.

The diesterification reaction can be conducted at temperatures of from about 80° to about 150° C. over periods of from about 4 to about 8 hours. However, other temperatures and periods of time can be employed although with lessened practicability. Most advantageously, the reaction is conducted within the temperature range of 90° to 120° C.

The diesterification reaction is advantageously conducted in a substantially unreactive liquid medium which does not interfere with the reaction. Examples of suitable liquid media which can be employed include the lower alkanols (i. e., those containing from 1 to 4 carbon atoms), 1,4-dioxane, etc. Most advantageously, methyl alcohol is employed as the liquid medium. The reactants can be simultaneously introduced into a reaction vessel containing the liquid medium, with heat being then applied until the completion of the reaction or, most advantageously, the alkylene oxide can be introduced slowly as the reaction proceeds. Thus, the dicarboxydiphenyl sulfone can be suspended in methyl alcohol and ethylene oxide can then be pumped into the reaction vessel as the reaction proceeds. The rapid and substantially quantitative reaction of alkylene oxides with discarboxydiphenyl sulfones in alcohol suspensions is quite unexpected because these sulfones are not appreciably soluble in methyl or ethyl alcohol at the temperatures employed.

The alkylene oxides are advantageously employed in proportions of from about 2 to about 3 mols per mol of the dicarboxydiphenyl sulfone being esterified. Most advantageously the ratio is from 2.2 to 2.4 mols per mol of the sulfone. Of course, higher or lower ratios can also be employed. The reaction is advantageously conducted in a closed vessel under autogenous pressure, i. e., the pressure developed by the reactants at the temperature of the reaction; such pressures are advantageously in the range of from about 100 to 200 lbs./sq. in. However, the rate of introduction of the alkylene oxide, e. g., the rate at which ethylene oxide is pumped into the reaction vessel, can be used to control the pressures developed so as to maintain them within this range (100–200 lbs./sq. in.) or at higher and lower pressures which are also quite effective. The pressure itself is not critical and is merely one of the factors in determining the rate at which the reaction proceeds, higher pressures generally resulting in more rapid diesterification.

Some monoester is usually obtained in the esterification reaction product; however, it can be readily removed from the diester by washing with a dilute aqueous alkaline solution such as a dilute solution of sodium bicarbonate, potassium bicarbonate, etc. However, when the diester is to be employed to prepare polyesters in accordance with my invention as further described hereinafter, it is unnecessary to remove the monoester since it will condense with the diester to give a polyester, e. g., by elimination of ethylene glycol from one end of the molecule and water from the other end.

The following examples will serve to further illustrate this phase of my invention as it relates to diesterifying dicarboxydiphenyl sulfones.

*Example 2.—β-Hydroxyethyl diester of bis-(p-carboxyphenyl) sulfone*

The following materials were placed in a pressure vessel:

36.0 g. bis(p-carboxyphenyl) sulfone.
16.0 g. ethylene oxide.
1.0 g. pyridine.
300.0 cc. methyl alcohol.

This mixture was then heated at from 90° to 100° C. for 8 hours in the pressure vessel with constant agitation. The reaction was then cooled and the product separated as a crystalline deposit. The methyl alcohol layer was decanted off and the crystalline deposit repeatedly extracted with hot acetone until no more material dissolved. An insoluble residue of about 4.0 g. of unreacted bis-(p-carboxyphenyl) sulfone remained. The acetone solution was then combined with the methyl alcohol solution and evaporated to dryness. The residue consisted principally of the β-hydroxyethyl diester of bis(p-carboxyphenyl) sulfone having the formula:

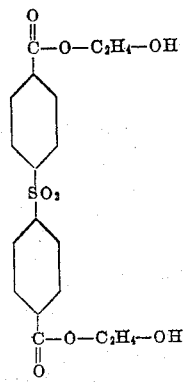

Upon titration of this product with standard NaOH solution at 25° C., it was ascertained that this product contained 4.0% of the mono-ester. The mono-ester was removed from the diester by extraction with a dilute aqueous solution of sodium bicarbonate. The diester which remained was crystallized from solution in dioxane to give a yield of 30 to 32 g. The diester has a melting point of 210° to 212° C. It analyzes as 8.1% sulfur which is the same as that calculated theoretically from the formula. The diester has a saponification value of 197.0 which is the same also as that calculated.

*Example 3.—β-Hydroxyethyl diester of bis(p-carboxyphenyl) sulfone*

The following materials were placed in an autoclave equipped with a stirrer and a gas inlet tube:

36.0 g. bis(p-carboxyphenyl) sulfone
1.0 cc. pyridine
300.0 g. methyl alcohol

The mixture in the autoclave was heated to from 110° to 120° C. with constant stirring for 4 hours during which period 16.0 g. of ethylene oxide was pumped in through the gas inlet tube. The reaction mixture was then cooled and the product treated in exactly the same manner as described in Example 1 above. The product obtained was a diester identical to that obtained in Example 1 and was obtained in a yield of from 70 to 80%.

*Example 4.—β-Hydroxypropyl diester of bis(p-carboxyphenyl) sulfone*

The same conditions described in Example 2 were reproduced with the exception that a molecularly equivalent quantity of 1,2-propylene oxide, i. e.

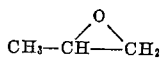

was employed instead of the ethylene oxide. The process was repeated in exactly the same manner otherwise, and a yield of from 50 to 60% of the di(β-hydroxypropyl) ester of bis(p-carboxyphenyl) sulfone was obtained which has the following formula:

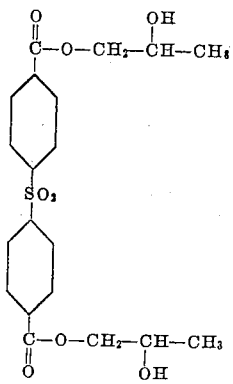

*Example 5.—β-Hydroxyethyl diester of bis(p-carboxyphenyl) sulfone*

Thirty-six (36) grams of bis(p-carboxyphenyl) sulfone, 300 g. of ethyl alcohol, and 1.0 cc. of triethylamine were placed in a pressure vessel (an autoclave) equipped with a stirrer and a gas inlet tube. The autoclave was heated at 120° to 125° C. for a period of four hours, during which period 16.0 g. of ethylene oxide was pumped into the autoclave and the reaction mixture was constantly stirred. The product was isolated in a manner analogous to that described in Example 2 to give a yield of 80-85 per cent of the diester.

In a manner similar to that set forth in the above working examples, 1,2-butylene oxide and 2,3-butylene oxide can be reacted in the presence of other catalysts such as dimethyl aniline, trimethyl amine, etc., to give the corresponding diesters.

Linear polyesters can be prepared from the free acidic dicarboxydiphenyl sulfones, or much more advantageously from their alkyl diesters or most advantageously from their β-hydroxyalkyl diesters, examples of each of which have been given above. These linear polyesters have very high melting or softening points, e. g. above 200° C. and are valuable in the manufacture of sheets, films, coatings, fibers, threads, filaments, molding plastics, etc.

In accordance with this phase of my invention, linear polyesters can be prepared by the following chemical reaction which is conducted in the presence of an alkali metal or alkaline earth metal, or a hydroxide or alkoxide thereof as a catalyst. This equation as given does not endeavor to encompass all the possible ramifications and side reactions that may be involved, but is merely presented as illustrative of what most probably actually occurs:

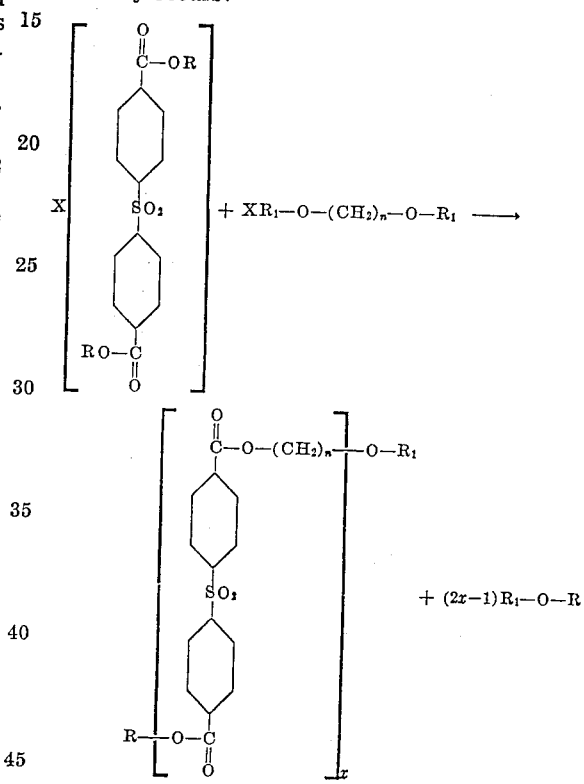

wherein R represents a hydrogen atom, an alkyl radical or a β-hydroxyalkyl radical, $R_1$ represents a hydrogen atom or an acyl radical, $n$ represents a small positive integer and X represents the number of molecules reacting to form any given linear polyester molecule.

The alkylene glycols which can be employed are straight chain alkane diols wherein the hydroxy radicals are positioned at the two ends of the alkylene chain. Examples of such glycols include ethylene glycol, 1,3-propylene glycol, 1,4-butylene glycol, 1,6-hexylene glycol, etc. As indicated above, mono or diesters of these glycols can also be employed. Thus, the acetates, propionates and butyrates are examples of such esters. Other derivatives can also be employed, such as diethylene glycol. Most advantageously, however, the straight chain alkylene glycols containing from 2 to 6 carbon atoms are employed. Ethylene glycol gives the most satisfactory linear polyester for most purposes.

Catalysts which can be employed are the alkali metal and alkaline earth metals dissolved in the glycol being reacted. The hydroxides and alkoxides of these metals can also be employed. Examples of such catalysts include lithium, sodium, potassium, magnesium, calcium, calcium hydroxide, calcium ethoxide, magnesium methoxide, sodium ethoxide, potassium hydroxide, lithium hydroxide, etc. From about 0.05 to about 0.5 per cent of such catalysts based on the weight of the dicarboxyphenyl sulfone being reacted is employed. Higher or lower percentages can also be employed.

The temperature at which polyesterification is conducted is dependent upon the specific reactants involved in any given reaction. In general, the reaction mixture is heated at from about 180° to about 200° C. for from approximately 2 to 3 hours in an inert atmosphere (e. g. nitrogen); the mixture is then heated at from about 240° to about 280° C. in the same atmosphere for approximately 1 to 2 hours. Finally, the pressure is greatly reduced to form a vacuum (less than 10 mm. of Hg pressure but preferably on the order of 1 mm. of Hg pressure or less) while the temperature is maintained in the same range (240°–280° C.); these conditions are maintained for approximately 4 to 6 additional hours. These conditions can be varied considerably depending upon the degree of polyesterification desired, the ultimate properties sought and the use for which the product is intended. Thus, partial substitution of the dicarboxydiphenyl sulfones with other dibasic organic acids may necessitate variations in these conditions of temperature, pressure and time periods required. The introduction of other modifiers into the reaction will involve variations in the conditions also. For example, mixed linear polyesters can be obtained by employing adipic acid, succinic acid, sebacic acid, etc. in combination with the dicarboxydiphenyl sulfone or its derivatives; these dibasic acids are saturated aliphatic dicarboxylic straight chain acids and may be referred to as alkanedioic acids containing from 4 to 10 carbon atoms. Similarly, unsaturated dibasic acids can also be substituted in part for the dicarboxy diphenyl sulfones to give polyesters which are useful in air-drying resins possessing valuable and distinctive properties, especially in the preparation of surface coating compositions of matter. Examples of such acids are fumaric acid, maleic acid, itaconic acid, etc. Other dibasic organic acids include phthalic acid, terephthalic acid, etc.

In order to obtain the valuable products according to my invention, it is essential that these linear polyesters be prepared employing only the glycols or their derivatives as specifically defined above. Glycols containing secondary or tertiary groups result in products having lower melting points with the consequence that they do not possess the usefulness of my products, e. g. British Patent No. 620,494 refers to such products. The comparison is illustrated by the following data. The polyesters of bis(p-carboxyphenyl)sulfone with ethylene glycol, 1,2-propylene glycol, and 1,3-propylene glycol were prepared and their melting points determined. In order to further illustrate the improvement in my linear polyesters over the prior art, data is also included as to linear polyesters of terephthalic acid, this data being taken from Carpenter, J. Soc. Dyers Colourists 65, 478 (1949).

| Acid Employed | Glycol Employed | Polyester's Melting Point, ° C. |
|---|---|---|
| Bis(p-carboxyphenyl) sulfone | Ethylene | 340 |
| Do | 1,2-Propylene | 180 |
| Do | 1,3-Propylene | 320 |
| Terephthalic acid | Ethylene | 250 |
| Do | 1,2-Propylene | 122 |
| Do | 1,3-Propylene | 221 |

From the data it can be seen that the presence of a secondary hydroxyl group, as found in 1,2-propylene glycol, lowers the melting point of the polyester by more than a hundred degrees.

In preparing the polyesters in accordance with my invention, it is of particular value to employ the β-hydroxyalkyl diesters of the dicarboxydiphenyl sulfones as the starting material because these diesters possess both the glycol and the acid components of the polyester. They can be reacted to produce polyesters as shown below, it being obvious that the chemical equations given are not complete pictures of all the ramifications involved in such types of reactions but are given for illustrative purposes as being representative of what most probably actually occurs.

(a) The reaction can be conducted in accordance with the chemical reaction formulated above wherein R represents a β-hydroxyalkyl radical. If the glycol is a simple glycol, viz. $R_1$ is a hydrogen atom, then the by-product of the reaction will be ROH, viz. a β-hydroxyalkanol.

(b) A linear polyester can be formed by reacting a β-hydroxyalkyl diester of a dicarboxydiphenyl sulfone with a dibasic organic acid such as those disclosed above in accordance with the following equation where the use of β-hydroxyethyl diester is illustrated, since it produces useful products most advantageously:

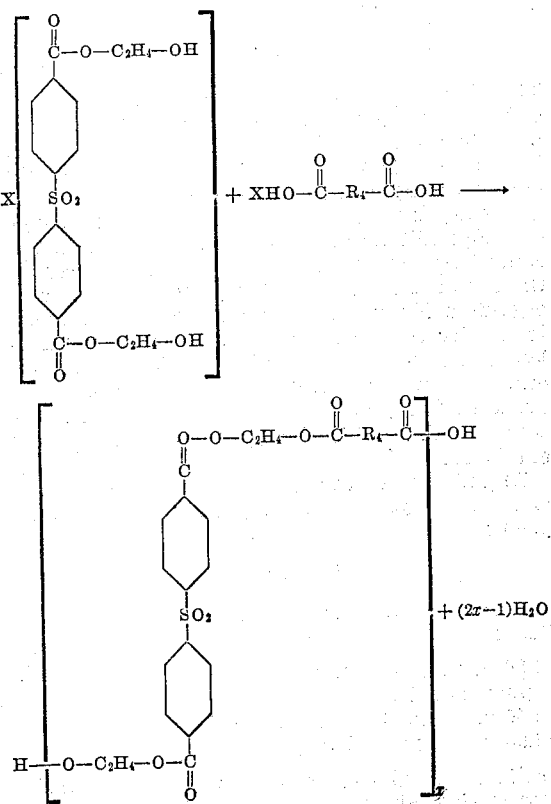

(c) The β-hydroxyethyl diester of a dicarboxydiphenyl sulfone can be converted directly into a polyester by heating. If other β-hydroxyalkyl diesters are employed, the resulting products will have inferior melting points due to the presence of branched chains in the internal linkages between dicarboxydiphenyl units in the polymeric structure, cf. the tabulated data above. The following equation illustrates the probable reaction upon heating the β-hydroxyethyl diester of bis(p-carboxyphenyl) sulfone:

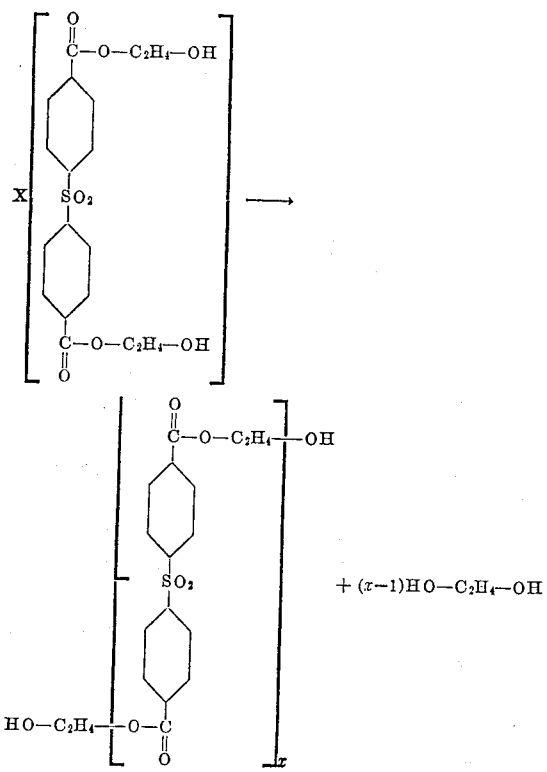

The linear polyester produced in this manner melts at such a high temperature that it decomposes before a sufficiently high molecular weight is obtained; hence, it is advantageous to admix one of the specified glycols or diethylene glycol with the β-hydroxyethyl diester of the dicarboxydiphenyl sulfone so as to partially simulate the conditions obtaining in (a) above. In lieu of the addition of such a glycol, one of the dibasic organic acids mentioned above can be employed to modify the reaction so as to partially simulate the conditions obtaining in (b) above. By either means, the effect is to reduce the melting point of the product to a practical value. Of course, both modifications can be simultaneously employed.

In order to further illustrate the preparation of linear polyesters, the following examples are given:

Example 6

The following ingredients were placed in a flask:

41.80 g. (1 mol) butyl diester of bis (p-carboxyphenyl) sulfone
12.40 g. (2 mols) ethylene glycol
16.96 g. (1.6 mol) diethylene glycol (ratio by weight of these two glycols is 0.731) and in this mixture 0.08 g. of sodium metal was dissolved. The mixture was heated under a nitrogen atmosphere at 180°–190° C. for 3 hours while butyl alcohol distilled off. The mixture was then heated at 280°–290° C. for 1 hour to distill off the excess glycols. The melt was then heated at 280°–290° C. under a reduced pressure of 0.05 mm. of Hg pressure for 6–8 hours. A hard tough resin was obtained that softened at 230°–240° C. It can be melted and spun to give strong fibers that cold-draw readily.

Example 7

The procedure of Example 6 was duplicated except that the ratio, by weight, of ethylene glycol to diethylene glycol was changed from 0.731 to 0.933 (without appreciably varying the total mol proportion of ethylene glycol and diethylene glycol employed) with the result that a resinous product was obtained that softened at 260°–270° C.

Example 8

Thirty-six (36) grams of the ethyl diester of bis (m-carboxyphenyl) sulfone and 35 g. of 1,4-butanediol were mixed together and 0.03 g. of Ca and 0.02 g. of Mg were added in the form of the alkoxides thereof. The temperature of this mixture was gradually raised to 200° C. during the course of 1 hour while pure, dry nitrogen was passed through the reaction vessel. The temperature was then maintained at 180°–190° C. for 3–4 hours and then at 280° C. for 30 minutes. The pressure was then reduced from atmospheric pressure to 0.05 mm. of Hg pressure and the melt was heated at 280°–290° C. at this pressure for an additional 4 hours. A hard, tough resin was obtained which is useful as a molding plastic.

Example 9

Forty (40) grams of the β-hydroxethyl diester of bis (p-carboxyphenyl) sulfone and 6.0 g. of adipic acid were mixed together and 0.04 g. of calcium hydroxide was added. This mixture was heated at 220°–230° C. for 3 hours in a stream of nitrogen. The temperature was then raised to 280°–290° C. for 1 hours longer. The pressure was then reduced to 0.1 mm. of Hg pressure, the temperature was increased to 280°–290° C. and these conditions were maintained for 3 more hours. The resulting product was a hard, tough resin that softened at 200°–210° C. It is useful as a molding plastic.

In a manner similar to that disclosed in the above examples, other diesters (including β-hydroxyalkyl diesters) of other meta- and para-dicarboxydiphenyl sulfones can be prepared which will have properties determined by the conditions selected for the reaction as well as by the nature of the reactants themselves. Modifying agents such as other dibasic organic acids or various mixtures thereof can be employed to alter the properties of the resinous products. Various mixtures of the above-defined glycols can also be employed for similar purposes.

What I claim as my invention and desire to secure by Letters Patent of the United States is:

1. A process for preparing a β-hydroxyalkyl diester of a dicarboxydiphenyl sulfone by reacting a dicarboxydiphenyl sulfone having the following formula:

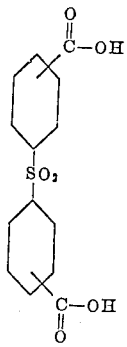

wherein each carboxyl group is located in a posi-

13 tion selected from among the meta and para positions, with an alkylene oxide selected from the group consisting of ethylene, 1,2-propylene, 1,2-butylene and 2,3-butylene oxide in the presence of a tertiary amine selected from among the group consisting of trialkylamines, dialkylanilines, pyridine and quinoline, at a temperature of from 80° to 150° C.

2. A process for preparing a β-hydroxyalkyl diester of a dicarboxydiphenyl sulfone by reacting a dicarboxydiphenyl sulfone having the following formula:

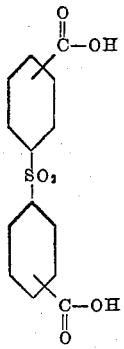

wherein each carboxyl group is located in a position selected from among the meta and para positions, with an alkylene oxide selected from the group consisting of ethylene, 1,2-propylene, 1,2-butylene and 2,3-butylene oxide in the presence of a tertiary amine selected from among the group consisting of trialkylamines, dialkylanilines, pyridine and quinoline, and in a substantially unreactive liquid medium, at a temperature of from 90° to 120° C.

3. A process for preparing a β-hydroxyalkyl diester of a dicarboxydiphenyl sulfone by reacting in a closed vessel a dicarboxydiphenyl sulfone having the following formula:

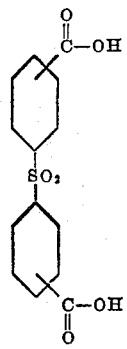

wherein each carboxyl group is located in a position selected from among the meta and para positions, with an alkylene oxide selected from the group consisting of ethylene, 1,2-propylene, 1,2-butylene and 2,3-butylene oxide in the presence of a tertiary amine selected from among the group consisting of trialkylamines, dialkylanilines, pyridine and quinoline, in a substantially unreactive liquid medium selected from the group consisting of the alkanols containing from 1 to 4 carbon atoms, at a temperature of from 90° to 120° C. and under autogenous pressure.

4. A process as defined in claim 3 wherein the two carboxyl groups are in the para positions, the alkylene oxide is ethylene oxide of which from about 2 to about 3 moles are employed for each mole of dicarboxydiphenyl sulfone being reacted, the tertiary amine is pyridine which is employed in amount from about 0.5 to about 3% by weight based on the weight of the dicarboxydiphenyl sulfone being reacted and the liquid medium is methyl alcohol.

5. A process as defined in claim 3 wherein the two carboxyl groups are in the para positions, the alkylene oxide is 1,2-propylene oxide of which from about 2 to about 3 moles are employed for each mole of dicarboxydiphenyl sulfone being reacted, the tertiary amine is pyridine which is employed in an amount of from about 0.5 to about 3% by weight based on the weight of the dicarboxydiphenyl sulfone being reacted and the liquid medium is methyl alcohol.

6. A process as defined in claim 3 wherein the two carboxyl groups are in the para positions, the alkylene oxide is ethylene oxide of which from about 2 to about 3 moles are employed for each mole of dicarboxydiphenyl sulfone being reacted, the tertiary amine is triethyl amine which is employed in an amount of from about 0.5 to about 3% by weight based on the weight of the dicarboxydiphenyl sulfone being reacted and the liquid medium is methyl alcohol.

7. A β-hydroxyalkyl diester of a dicarboxydiphenyl sulfone having the following formula:

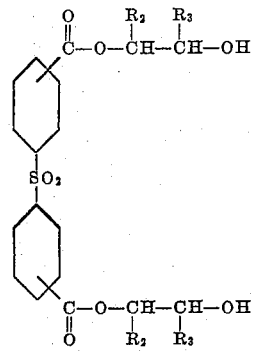

wherein the nuclear substituent groups each contains from 3 to 5 carbon atoms and are attached to the phenyl nucleus in a position selected from among the meta and para positions and $R_2$ and $R_3$ each represents a substituent selected from the group consisting of a hydrogen atom, a methyl radical and an ethyl radical.

8. The β-hydroxyethyl diester of bis(p-carboxyphenyl) sulfone.

9. The β-hydroxypropyl diester of bis(p-carboxyphenyl) sulfone.

10. The β-hydroxyethyl diester of bis(m-carboxyphenyl) sulfone.

JOHN R. CALDWELL.

REFERENCES CITED

The following references are of record in the file of this patent:

UNITED STATES PATENTS

| Number | Name | Date |
|---|---|---|
| 2,197,880 | Schroter et al. | Apr. 23, 1940 |
| 2,342,142 | Harris et al. | Feb. 22, 1944 |
| 2,380,685 | Cook et al. | July 31, 1945 |
| 2,410,073 | Howard | Oct. 29, 1946 |
| 2,461,740 | Kiebler | Feb. 15, 1949 |
| 2,465,319 | Whinfield et al. | Mar. 22, 1949 |